Oct. 14, 1952 H. Z. GORA 2,613,374
FASTENER AND WASHER ASSEMBLING
Filed Nov. 19, 1947 4 Sheets-Sheet 1

INVENTOR
Henry Z. Gora
BY
Johnson and Kline
ATTORNEY

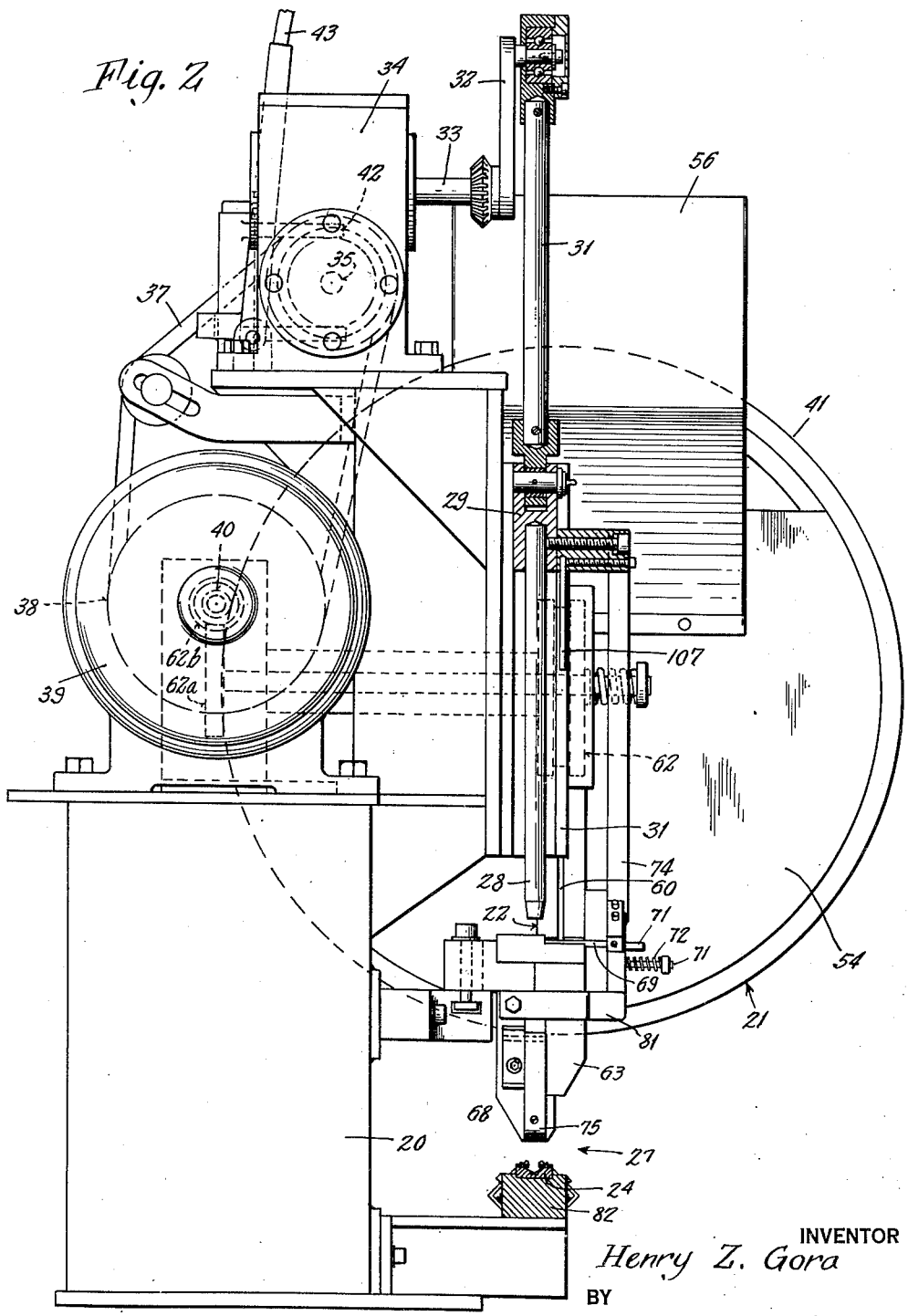

Oct. 14, 1952 H. Z. GORA 2,613,374
FASTENER AND WASHER ASSEMBLING
Filed Nov. 19, 1947 4 Sheets-Sheet 3
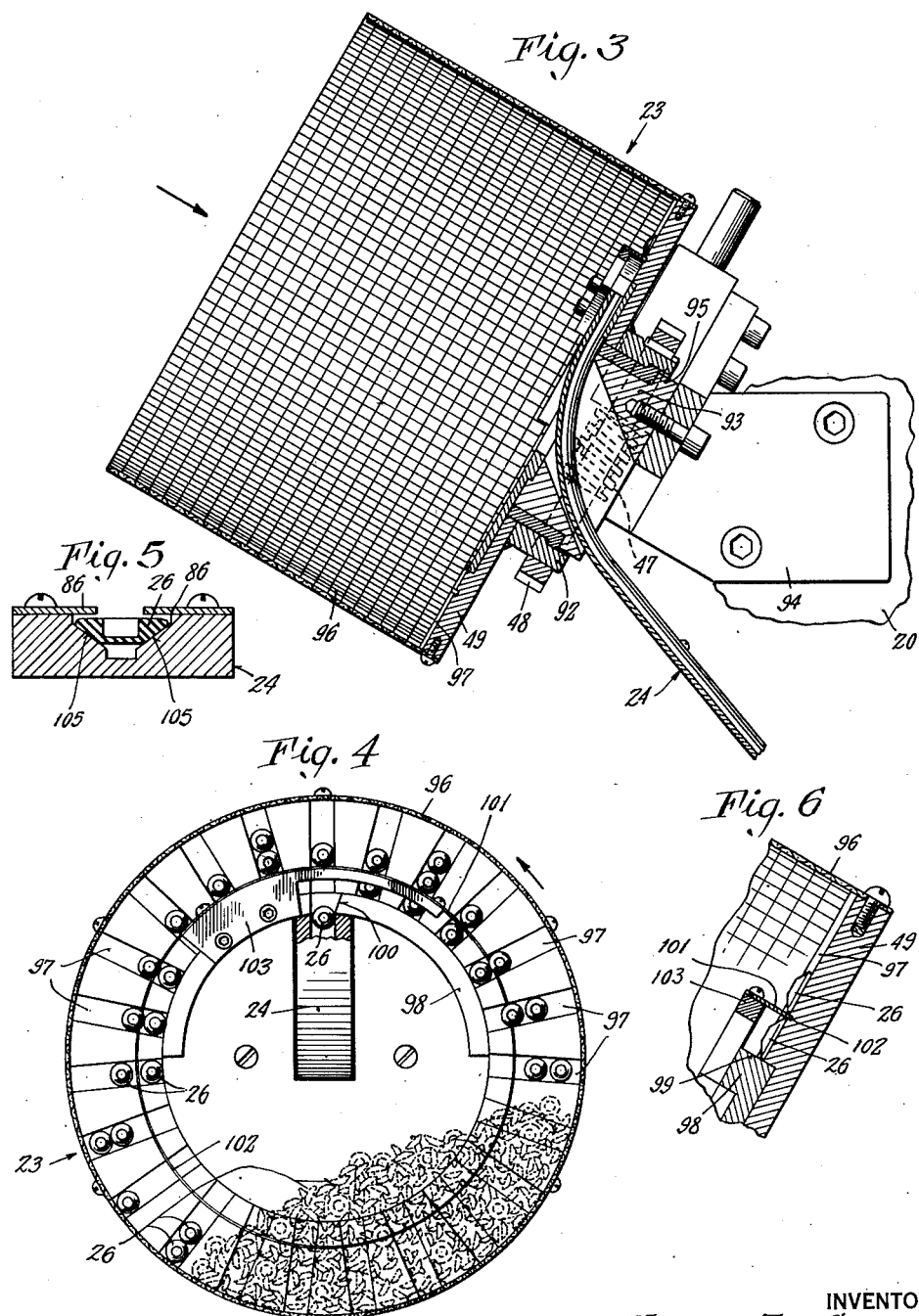
INVENTOR
Henry Z. Gora
BY
Johnson and Kline
ATTORNEY Oct. 14, 1952
H. Z. GORA
2,613,374
FASTENER AND WASHER ASSEMBLING
Filed Nov. 19, 1947
4 Sheets-Sheet 4
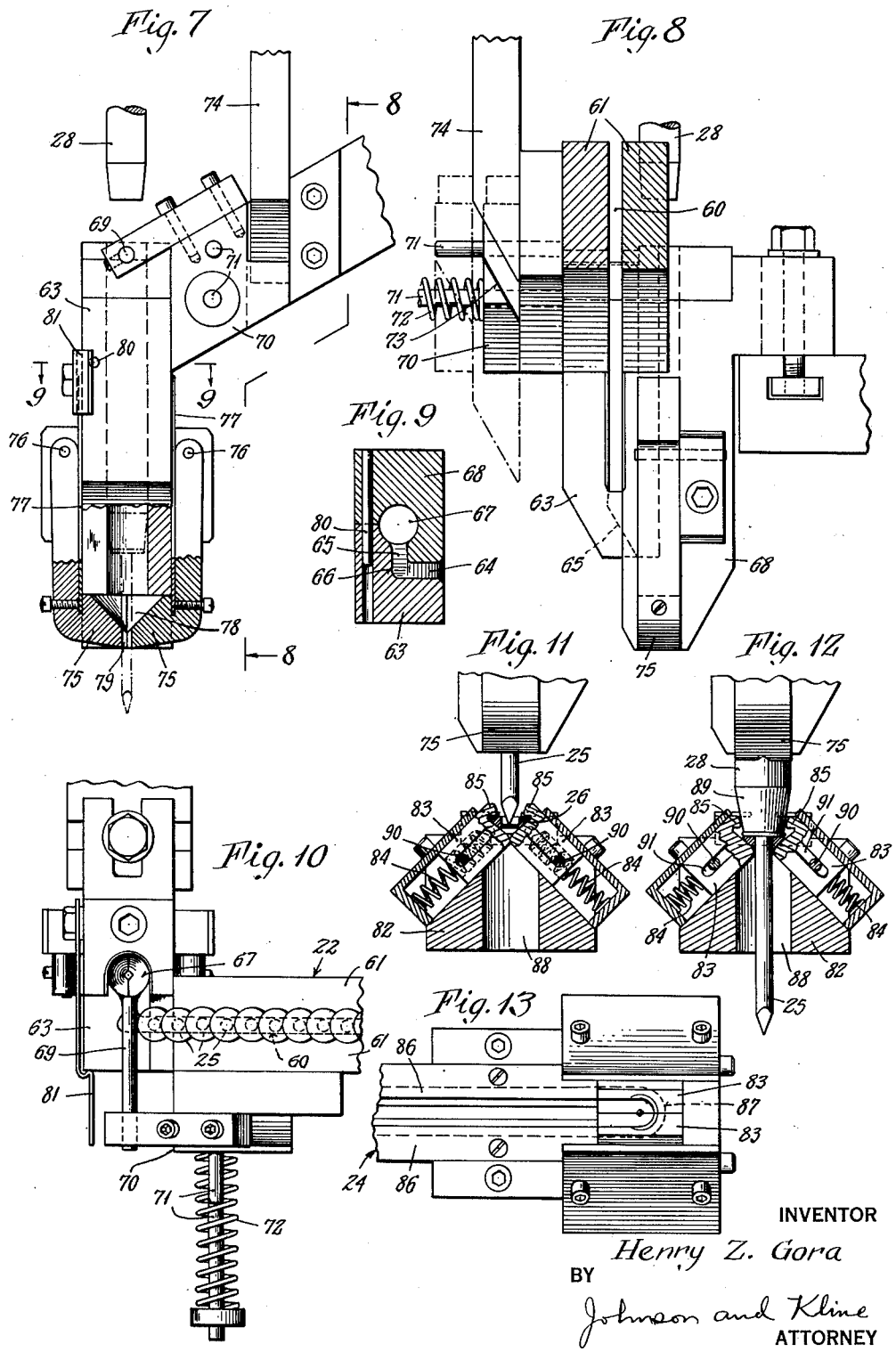
INVENTOR
Henry Z. Gora
BY
Johnson and Kline
ATTORNEY Patented Oct. 14, 1952

2,613,374

UNITED STATES PATENT OFFICE 2,613,374

FASTENER AND WASHER ASSEMBLING

Henry Z. Gora, Stratford, Conn., assignor to The Gora-Lee Corporation, Stratford, Conn., a corporation of Connecticut Application November 19, 1947, Serial No. 786,849

10 Claims. (Cl. 10—155)

This invention relates to assembling machines, and more particularly, to a machine for assembling elongate bodies such as nails and screws with circular or annular bodies such as washers.

In this application, where the term "fastner" is used, it is intended to include nails, screws, rivets and all like or analogous bodies; similarly where the term "washer" is used it is intended to include all bodies having the shape or performing the function of a washer. Where the term "composition" is used, it is intended to include all rubber-like materials such as natural rubber, artificial rubber, synthetic rubber and compounds including any of these and other materials, also plastic and fibrous materials, in short all materials other than metal.

An object of the invention is to provide a machine which will automatically assemble fasteners with composition washers so that the latter is placed on the fastener in desired position, for instance, so that it lies flat against the underside of the head of the fastener; and further, to effect the assembly at such a rapid rate and at such low cost as to make the use of such fasteners with washers economically advantageous.

In carrying out this object of the invention, I provide a machine having a suitable fastener hopper and chute for presenting at an assembly station a succession of fasteners in upright head-up position, and a washer hopper and chute for presenting at the assembly station a washer positioned directly under a fastener, and then drive the fastener into the washer and eject the assembled fastener and washer from the assembly station.

The washer is described and claimed in the application of Robert L. Holcomb, Serial No. 701,697, filed October 7, 1946 now Patent Number 2,439,516 issued April 13, 1948, and may have a preformed recess closed by a diaphragm to receive and be pierced by the point of the fastener or it may have a hole smaller than the shank of the fastener or no hole at all and be merely pierced by the fastener. In any event, the washer is frictionally held on the fastener which penetrates it and remains so during shipment and use. The washer is made of a composition of desired hardness, but preferably if the fasteners are to be used in exposed places subject to atmospheric conditions, the washers are made of substantially soft, resilient oil-proof and light-proof yieldable material such as synthetic rubber, "neoprene" for instance.

The washer may be flat, that is plane on both sides, or it may be flat on one side and convex on the other, and the latter is preferable since it provides a greater amount of resilient material around the shank of the fastener against the entrance of water and moisture and facilitates sealing over the hole pierced in a piece of metal—aluminum siding or roofing for instance.

The fact that the desired washer is not flat, or at best the same on both sides, presented what seemed an insurmountable difficulty in feeding and controlling the washers, for they had to be presented to the fasteners flat side up.

An important feature of this invention is the provision of means for so handling and controlling the washers that they will be assembled on the fasteners with the flat-side of the washer lying against the underside of the head of the fastener.

To accomplish this, the present invention provides a hopper for the washers comprising a drum turning on an inclined axis, approximately 45° from the perpendicular, and the bottom of the drum has a plurality of radial channels on which a mass of washers in the drum tumble as the drum is rotated, and into which the washers tend to lodge and be carried about to an upper portion where they tend to ride radially under the force of gravity to the mouth of the chute. The channels are so shallow, however, that should the convex side of a washer lie against the floor of the channel it will not be retained but will slide out and fall on the tumbling mass. Only washers having their flat side engaging the floor of the channel will remain therein. The channels are long enough to simultaneously hold several washers edge to edge thereby insuring that at least one washer will remain in the channel by the time the chute is reached.

The inner end of the channels are closed by a stationary annular rail which is engaged by the innermost washer in each channel, except at the mouth of the chute where the rail is interrupted allowing the washer to enter the chute. To keep the outer washers of each channel from following the inner one into the chute a stationary auxiliary rail or separator plate is located at, and slightly ahead of, the chute throat and in position to extend between the first and second washer, if there be one, and there usually is, and this separator plate holds the second and following washers from radially sliding out of the channels. The separator plate should not extend far beyond the chute throat, however, because frequently as the drum rotates the inner washer might fall out of the channel and the next one take its place before the chute throat is reached, and if the separator were too long this might result in a channel with an empty inner end reaching the throat.

Contrary to the usual practice of feeding material, I have found that it is not practical to feed the washers in a continuous stream down the chute to the assembly position, because they have quite a thin edge and being composed of a naturally tacky material, jam in the tube and will not feed to the assembly position.

I have solved this difficulty by rotating the drum of the washer hopper in time relation with the fastener feeding and driving mechanism so that only one washer passes from the selecting channel into the chute and into assembly position for each fastener positioned and driven. I have further found that a stream of air (from a compressor) directed along the chute toward the assembly position accelerates the travel of the washer and aids in the positioning thereof so that the machine can be operated at higher speed than if the air stream were discarded.

With regard to the fastener feeding mechanism, the present invention represents a departure from, and an improvement over the prior practice in feeding nails, and the jamming of the fasteners at the assembly position caused by imperfect and malformed fasteners, is substantially reduced. To do this, instead of employing an escapement mechanism intended to let one fastener at a time drop into the assembly throat from the end of the chute, the present invention positively moves the end fastener from a continuous stream thereof in the chute into the assembly throat where it is guided in falling to the jaws which hold it in preparation for the driving operation.

Other features and advantages will hereinafter appear.

In the accompanying drawings—

Fig. 2 is a vertical sectional side view taken thru the assembly station.

Fig. 3 is a sectional view of the washer hopper and upper portion of the hopper chute.

Fig. 4 is a view looking down into the washer hopper in the direction of the arrow shown in Fig. 3.

Fig. 5 is a cross-sectional view of the washer chute.

Fig. 6 is a detail sectional view showing the means in the washer hopper for controlling the washers so that only one washer at a time is fed to the assembly station.

Fig. 7 is a front view of the assembly station showing part of the nail chute, parts of the nail holding jaws being broken away.

Fig. 8 is a vertical sectional view, taken on the line 8—8 of Fig. 7.

Fig. 9 is a sectional view taken on the line 9—9 of Fig. 7.

Fig. 10 is a plan view of the parts shown in Figs. 7 and 8.

Fig. 11 is a vertical sectional view of the washer holding means at the assembly station showing a nail about to penetrate a washer.

Fig. 12 is a view similar to Fig. 11, showing the nail in position in the washer.

Fig. 13 is a plan view of the lower end of the washer chute and washer holding means at the assembly station.

Figure 1:
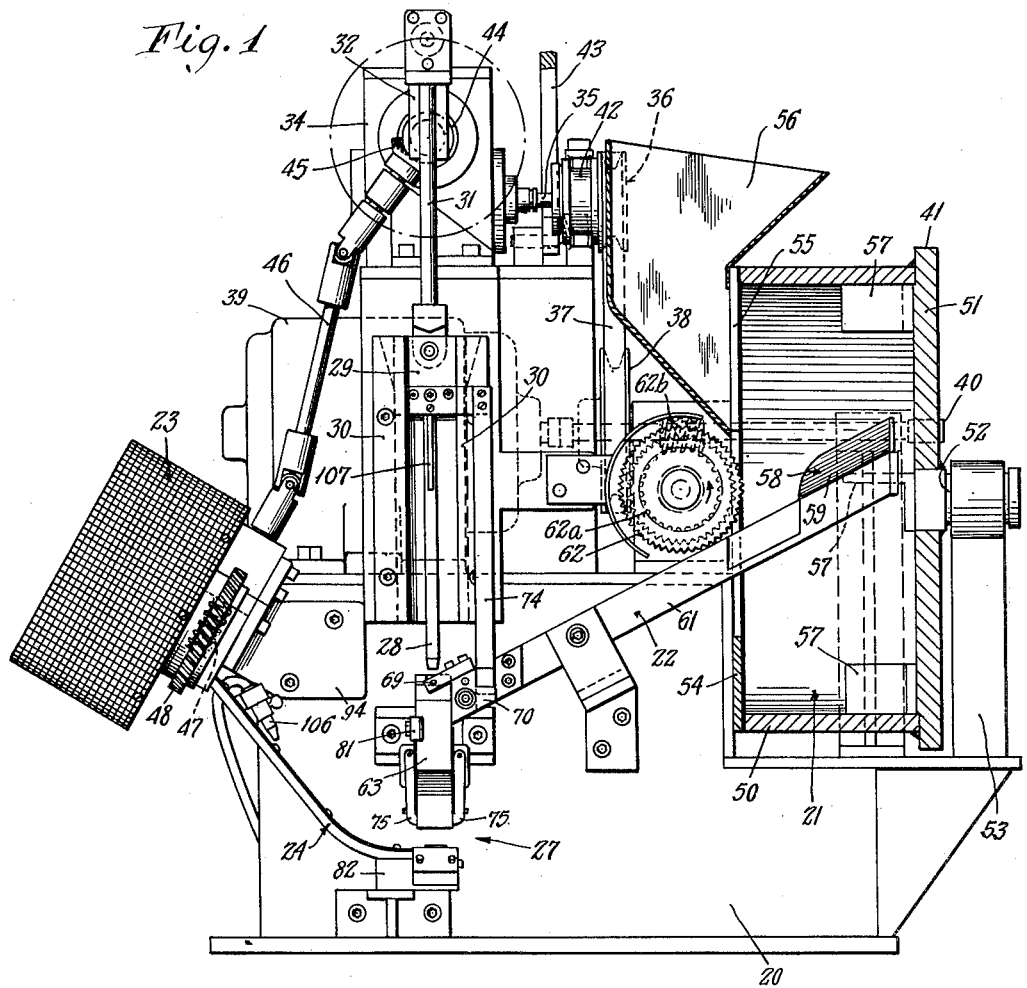
Figure 1 is a front view of the assembling machine of the present invention showing certain of the parts in section.
Figure 14:
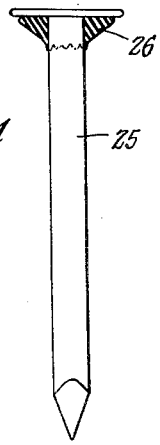
Fig. 14 is an enlarged view of the assembled washer and nail with the washer in section.

As shown in the accompanying drawings, the machine of this invention comprises a base or frame 20 having rotatably mounted thereon a nail hopper 21 and nail chute 22 and a washer hopper 23 and washer chute 24 by means of which a nail 25 and a washer 26 are brought to an assembly station 27 where the nail is driven into the washer and discharged as an assembled unit by operation of a plunger 28.

The plunger 28 is connected to a cross-head 29 sliding in vertical ways 30 and the cross-head is connected by a link 31 and crank arm 32 to the drive shaft 33 of gear reduction unit 34 having another shaft 35 provided with a pulley 36 connected by a belt 37 to a pulley 38 of an electric motor 39. The motor shaft has a friction wheel 40 engaging a flange 41 on the nail hopper 21 to rotate the same. A clutch 42 operated by a release lever 43 releasably connects the pulley 36 to reduction gear shaft 35. The slow speed shaft 33 of the reduction gear also carries a bevel gear 44 engaging a bevel gear 45 on a jointed shaft 46 having on its lower end a worm 47 (Figs. 1 and 3) engaging a worm wheel 48 secured to the bottom plate of the washer hopper.

It will thus be seen that the operation of the plunger 28 is synchronized with the rotation of the washer hopper and that the nail hopper rotates simultaneously except when the clutch release lever 43 is raised, in which event the plunger and washer hopper stop while the nail hopper continues to rotate.

The nail hopper 21 is in the form of a hollow cylinder 50 secured to a plate 51 having a stub shaft 52 rotatable in a bearing bracket 53. The other end of the cylinder 50 is closed by a stationary plate 54 secured to the frame 20. The plate 54 has an opening 55 at its upper end over which is fitted a funnel 56 through which a supply of nails may be fed to the hopper 21. On the inside of the cylinder 50 is a series of plates 57 each of which picks up a quantity of nails in the hopper and drops them across the axis of the hopper. In the path of the falling nails is a throat 58 of the nail chute 22. The throat 58 has inclined sides 59 which guide the nail point downward into a slot 60 of the chute 22 so that the nails can slide down the chute and accumulate therein with the heads of the nails sliding on the upper surfaces of the rails 61 making up the chute. The chute 22 extends through an opening in the plate 54 and at that point there is a star wheel 62 which rotates counter-clockwise as shown in Fig. 1 to spread out the nails and avoid a bunch of nails, projecting more or less from the chute, from sliding down the chute. The star wheel 62 is provided with a worm wheel 62a driven by a worm 62b driven by the shaft of the motor 39.

One of the features of the present invention is the feeding of the nails from the nail chute 22 to the assembly station positively and without the use of an escapement mechanism. For this purpose, the end of the nail chute 22 is closed by a block 63 having a slot 64 which aligns with the slot 60 in the chute. The slot 64 has a right angle bend 65 so that the nails travelling down the chute and into the slot 64 come to a stop against a wall 66 where the terminal nail is arrested, and it is from this position that the nail is positively pushed into an aperture 67 formed by the block 63 and a companion block 68 and through which the plunger 28 moves.

To so transfer the nails from the slot 64 to the aperture 67, there is provided a push rod 69 for engaging the head of the nail and moving the nail laterally. This push rod is mounted on a block 70 which is slidably mounted on pins 71 carried by the chute structure 22 and actuated by a spring 72 surrounding one of the pins 71. The block 70 has a cam surface 73 which is in position to be engaged by a cam bar 74 carried on the cross-head 29 of the plunger 28 so that as the plunger 28 descends the cam bar 74 engages the cam 73 and moves the push rod 69 outwardly so that the next nail can reach the bend 65 in the slot 64 and so that the end of the push rod is in position to engage the head of the nail. As the plunger 28 rises and clears the aperture 67, the cam rod 74 permits the spring 72 to push the block 70 and push rod 69 inwardly, moving the nail over into position to fall into the aperture 67.

The blocks 63 and 68 together form a guide for the nail and the lower end of the guide is closed partially by jaws 75 pivotally mounted at 76 on the block 68, the jaws being held closed by a leaf spring 77. As the nail falls through the aperture 67, its point comes to rest at the apex of a conical recess 78 formed by the upper surfaces of the jaws while its head rests against the wall of the aperture 67 so that the shank of the nail is substantially vertical.

As the plunger comes down, it engages the head of the nail in the guide, forces the shank through the space between the jaws, and finally forces the jaws apart by the head of the nail engaging the conical surfaces 78 of the jaws so that the nail is driven into the washer as hereafter described and discharged from the nail guide. The contacting surfaces of the jaws are provided with an aperture 79 which substantially fits the shank of the nail, thereby guiding the nail and maintaining it substantially vertical until the head of the nail engages the conical surfaces 78 of the jaws.

It sometimes occurs that a misshaped or otherwise faulty nail is fed down the chute and into the aperture 67 causing the plunger to jam and rendering the device temporarily inoperative. In order to facilitate removal of the faulty nail, the blocks 63 and 68 are made physically separate —the block 63 being slidable on a pin 80 carried by the block 68, and being held to the block 68 by a leaf spring catch 81. By releasing the catch, the block 63 can be removed, thus opening the nail guide for the removal of any obstruction.

The assembly station also includes a washer supporting block 82 which is coextensive with the lower end of the washer chute 24. The washer holder comprises a pair of jaws 83 which are slidably mounted in the block 82 to move toward and from each other and the axis of the plunger 28 at an angle and are held in their uppermost and mutually engaged positions by springs 84. The jaws 83 have overhanging portions 85 coextensive with the cover rails 86 of the chute 24, and hence when the washer slides down the chute it comes to rest under the overhanging portions 85 and against the ends 87 of the slots in the jaws, as shown in Fig. 11, in which the washer is positioned so that the nail, when driven by the plunger 28, will be forced through the center of the washer—the parts being shown in Fig. 11 in the position which they occupy just before the nail pierces the washer. As the nail descends, the pointed end of the shank is forced through the washer and between the jaws 83 to the position shown in Fig. 12, the jaws receding downwardly and outwardly. Continued movement of the nail and plunger 28 causes the jaws to further separate and permit the assembled nail and washer to pass down through an aperture 88 to a suitable receptacle. This further recession of the jaws may be accomplished by the pressure of the washer against the inclined surfaces of the jaws or by a tapered surface 89 on the plunger itself, and the tension of the springs 84 should be such that the jaws do not separate more than is necessary to allow the shank of the nail to pass between until the parts assume the position shown in Fig. 12, with the washer snugly fitting against the underside of the head of the nail. The jaws 83 are kept from unintentionally escaping from the block 82 by stop pins 90 which engage slots 91 in the jaws.

Ordinarily, in hopper feeds for washers, etc., it is customary to permit the washers to slide down the chute in edge-to-edge engagement and permit one washer at a time to move into assembling position. I have found, however, that with washers having tacky surfaces, such, for instance, as washers made of synthetic or other rubber material, and especially when the washers do not have regular edges, they tend to stick and overlap each other in the chute and jam. This difficulty has been obviated by the present invention by permitting only one washer at a time to pass from the hopper to the chute, and thus the hopper of the present invention incorporates means for selectively presenting to the chute only a single washer for each cycle of the machine.

As will be seen from an examination of the washer in Fig. 5, the upper surface of the washer which engages the head of the nail is flat, while the under surface is dome-shaped or crowned, and that it is therefore necessary to present the washer to the assembling station with the flat side uppermost.

Another important feature of this invention is the provision of means in the hopper whereby the washers are collected right side up so that when they reach the assembly station the flat side will be in proper position.

For this purpose, the washer hopper 23 is set to rotate on an inclined axis so that the base plate 49 is tilted with respect to the perpendicular. The base plate 49 of the hopper is provided with a bearing sleeve 92 which is rotatably mounted on a bearing 93 carried by a bracket 94 secured to the main frame, and it is on this bearing sleeve 92 that the worm wheel 48 is secured—the bearing 93 having a flange 95 to take the thrust of the hopper. The hopper is generally cylindrical in form and preferably comprises a wire basket 96 in which a quantity of washers is placed. Any particles of dust or other foreign matter adhering to the washers is shaken loose and drops through the mesh of the basket during the rotation of the hopper.

In order to pick the washers up from the mass thereof contained within the hopper preparatory to presenting them to the chute 24, the base plate 49 of the hopper is provided with a succession of radial slots 97. These slots are just wide enough to receive a washer in flat condition and are so shallow that should a washer attempt to remain in the slot with its convex side against the plate 49, it would fall out by gravity. The inner ends of the slots are closed by a plate 98, and thus as the hopper rotates the washers sliding toward the axis of the hopper come to rest against face 99 of the plate 98 and the innermost washer is carried in this position until end 100 of the plate 98 is reached, whereupon it falls by gravity into the upper end of the chute 24 and slides down the chute to position between the jaws 83. It may happen by chance that the innermost washer might fall out of its slot 97 as it is moving upwardly toward its discharged position, and therefore the slots 97 are made long enough so that several washers may lie in each slot at the same time, thereby providing an alternate washer in case the innermost washer drops out. However, it is not desired that more than one washer escape into the mouth of the chute 24 and therefore an arcuate dividing plate 101 is set over the base plate 97 to separate the innermost from the outer washers as the discharge point is approached. This separator plate preferably rides in a groove 102 in the base plate and as each group of washers approaches its edge the latter forces itself between the adjacent washers.

The separator plate 101 is carried by an arm 103 secured to the plate 98 and since there is no reason for allowing the subsequent washers to drop into position against the bar 98 at the delivery point or beyond the same, the separator 101 is extended a substantial distance beyond the delivery point. The washers left in the slots 97 may then fall toward the center but this is of no consequence, for they may remain in the slot or not as chance would have it as the slot dips into and passes through the mass of washers in the lower portion of the hopper.

By having a large number of slots and having them long enough to hold several washers, it has been found that at least one washer will always be left in the slot to be discharged as the slot passes the end 100 of the inner bar 98.

As the washer drops into the throat of the chute, its flat side first slides on the cover rails 86, then, as the chute curves down and around, the washer slides on inclined surfaces 105 on the main body of the chute 24. Instead of one cover rail for the closing of the chute, it is preferable to have two, one on each side, as shown, so that if a washer becomes jammed, for instance by it being slightly oversize, it may easily be removed by hand.

When the washers are rather light as in this case where they are made of artificial rubber, they may not have sufficient weight to carry them down and around to the jaws 83. For the purpose of assisting and accelerating the movement of the washers, there is provided a jet of compressed air issuing from the nozzle 106 and directed along the chute in the space between the cover rails 86. Thus, as the washer drops, it passes the jet of air and the latter gives it sufficient impetus to carry it to the assembling station.

As stated above, the movement of the plunger 28 is so coordinated with the nail feeding mechanism and with the washer hopper 23 that for each reciprocation of the plunger 28 one nail is presented to the assembly station and one washer is allowed to pass from the hopper down the chute 24 to the assembly station, and hence the driving train between the plunger 28 and the hopper 23 is such that for each reciprocation of the plunger 28 the hopper moves through the angle between two washer-containing slots 97.

To positively insure that the head of the nail rest substantially flat on the top surface of the block 63 and in the path of the push rod 69, a plunger 107 carried by the reciprocating mechanism, preferably by the cross head 29 engages the head of the following nail when the plunger 28 is all the way down in assembling the previous nail and washer.

Variations and modifications may be made within the scope of the invention, and portions of the improvements may be used without others.

I claim:

1. A machine for assembling nails and washers comprising in combination a nail hopper, a washer hopper, means presenting the nails one at a time from the nail hopper to an assembly position, means presenting the washers one at a time from the washer hopper to the assembly position in axial alignment with the nail, and means driving the positioned nail into the positioned washer, characterized by the fact that there is a chute carrying a succession of nails from the nail hopper to the assembly position; means to spread out said nails in evenly spaced contacting relationship; and means at the assembly position positively moving one nail at a time from the end of the chute laterally into position over a located washer, and further by the fact that there is a washer chute carrying the washers from the washer hopper to the assembly position and means delivering one washer at a time in spaced non-contacting relationship from the washer hopper to the washer chute to be carried therein out of contact with preceding or succeeding washers and presented one at a time to said assembly position.

2. A machine for assembling nails and washers comprising in combination means presenting one washer at a time to an inclined washer chute to be carried therein out of contact with preceding or succeeding washers and presented one at a time to an assembly position; a nail chute; means forcibly moving one nail at a time from the nail chute laterally to said assembly position in axial alignment with the washer; means driving said positioned nail into the positioned washer; and means carried by the driving means controlling the operation of said nail moving means.

3. A machine for assembling nails and washers comprising in combination a guide tube having a separable front block and rear block; means placing nails on a nail chute; means forcibly moving one nail at a time laterally from said nail chute into said guide tube; means positioning a washer under said guide tube in axial alignment with the nail; and a reciprocating rod engaging the nail and driving it into said washer, said rod entering said guide tube in driving said nail and said rod having means carried thereby and reciprocating therewith for controlling the operation of said nail moving means to move a nail into said guide tube after the rod is withdrawn therefrom.

4. A machine for assembling nails and washers comprising in combination a guide tube; means forcibly moving one nail at a time into said guide tube; means positioning a washer under said guide tube in axial alignment with the nail; and a reciprocating rod engaging the nail and driving it into said washer, said guide tube comprising a front block and a rear block held together by a catch means which is easily removable to provide for separation of said front block and rear block to permit a jam caused by a malformed nail to be cleared, said catch means preventing the separation of said blocks during normal operation of said machine.

5. A machine for assembling nails and washers comprising in combination a guide tube having a separable front block and rear block; spring actuated means forcibly moving one nail at a time into said guide tube; means positioning a washer under said guide tube in axial alignment with the nail; and a reciprocating rod adapted to engage the nail and drive it into said washer, said rod having means reciprocating therewith and carried thereby for controlling the operation of said nail moving means, adapted to charge said spring-actuated means by the advancing movement of the driving rod and release said means for nail feeding operation by the retracting movement of said rod.

6. A machine for assembling nails and washers comprising a guide tube having a separable front block and rear block; means forcibly moving one nail at a time laterally into said guide tube; means positioning a washer under said guide tube in axial alignment with the nail; a reciprocating rod engaging the nail and driving it into said washer, said nail moving means including a spring operated push-rod for engaging the head of the nail and forcibly moving it into the guide tube; and a cam reciprocating with and carried by the driving rod for retracting said push-rod in synchronism with the reciprocations of the driving rod.

7. A machine for assembling nails and washers comprising means positively presenting one nail at a time to an assembly position including a washer chute; means depositing one washer at a time in the washer chute; pneumatic means positioning said washer in axial alignment with the positioned nail; and means driving the latter into the washer, said washer positioning means including a pair of jaws yieldingly mounted so as to recede and permit the assembled nail and washer to be pressed vertically downward between the jaws after the head of the nail has been brought into engagement with the face of the washer.

8. A machine for assembling nails and washers comprising means positively presenting one nail at a time to an assembly position including a washer chute; means depositing one washer at a time in the washer chute; pneumatic means positioning said washer in axial alignment with the positioned nail; and means driving the latter into the washer, said washer positioning means including a pair of jaws yieldingly mounted and having cam surfaces for engagement with the driving means whereby the jaws are caused to recede and permit the assembled nail and washer to be pressed vertically downward between the jaws after the head of the nail has been brought into engagement with the face of the washer.

9. The combination in a machine for applying washers to nails including mechanism for feeding successive nails to a nail chute; means presenting the nails laterally in positive fashion one at a time to an assembly station and having a reciprocating plunger at said station operable to drive successive nails through successive washers; of a rotary hopper adapted to hold a plurality of washers; a chute for transmitting washers from said hopper to said assembly station having a mouth opening into said hopper; means actuated by the rotation of the hopper for successively delivering to said chute single washers in spaced relation to each other; and means rotating said hopper and coordinating the speed of rotation thereof with the reciprocations of said plunger to deliver one washer to said chute for each cycle of operations.

10. The combination in a machine for applying washers to nails including mechanism for feeding successive nails to a nail chute; means presenting the nail laterally in positive fashion one at a time to an assembly station and having a reciprocating plunger at said station operable to drive successive nails through successive washers; of a rotary hopper adapted to hold a plurality of washers; a chute for transmitting washers from said hopper to said assembly station having a mouth opening into said hopper, means actuated by the rotation of the hopper for successively delivering to said chute single washers in spaced relation to each other; and means rotating said hopper in such timed relation to the reciprocations of said plunger as to deliver washers to said chute for transmission to said station and application to said nails without permitting contact between successive washers.

HENRY Z. GORA.

REFERENCES CITED

The following references are of record in the file of this patent:

UNITED STATES PATENTS

| Number | Name | Date |
| --- | --- | --- |
| 289,941 | Swift | Dec. 11, 1883 |
| 335,212 | Brosnan | Feb. 2, 1886 |
| 476,191 | Ells | May 31, 1892 |
| 480,530 | Tobey | Aug. 9, 1892 |
| 552,043 | Crombie | Dec. 24, 1895 |
| 622,476 | Hubbell | Apr. 4, 1899 |
| 1,063,593 | Raiche | June 3, 1913 |
| 1,165,078 | Draher | Dec. 21, 1915 |
| 1,182,594 | Stanley | May 9, 1916 |
| 1,272,634 | Escobales | July 16, 1918 |
| 1,749,856 | Taylor | Mar. 11, 1930 |
| 1,879,895 | Fenton | Sept. 27, 1932 |
| 2,058,034 | Prochiette | Oct. 20, 1936 |
| 2,060,182 | Dellaree | Nov. 10, 1936 |
| 2,203,287 | Smith | June 4, 1940 |
| 2,263,858 | Borge | Nov. 25, 1941 |
| 2,273,782 | Irwin | Feb. 17, 1942 |
| 2,356,103 | Tourjee, Jr. | Aug. 15, 1944 |
| 2,433,561 | Angell | Dec. 30, 1947 |